United States Patent
Lal et al.

(10) Patent No.: US 7,279,447 B2
(45) Date of Patent: *Oct. 9, 2007

(54) SUBTERRANEAN WELL AND OIL OR GAS STREAM TREATMENT WITH BIS(3-ALKOXYALKAN-2-OL) SULFIDES, SULFONES, AND SULFOXIDES: NEW SURFACE ACTIVE AGENTS

(75) Inventors: Gauri Sankar Lal, Whitehall, PA (US); Williams Rene Edouard Raymond, New Tripoli, PA (US); Khalil Yacoub, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/698,701

(22) Filed: Jan. 25, 2007

(65) Prior Publication Data

US 2007/0123428 A1    May 31, 2007

Related U.S. Application Data

(60) Division of application No. 11/076,723, filed on Mar. 10, 2005, now Pat. No. 7,205,431, which is a continuation-in-part of application No. 10/899,419, filed on Jul. 26, 2004, now Pat. No. 7,049,472.

(51) Int. Cl.
*C09K 8/35* (2006.01)
*E21B 33/00* (2006.01)

(52) U.S. Cl. ............... 507/139; 166/268; 166/270; 166/270.1; 175/65; 507/103; 507/136; 507/203; 507/261; 507/266

(58) Field of Classification Search ............... 507/134, 507/135, 136, 252, 253, 255, 261
See application file for complete search history.

(56) References Cited

U.S. PATENT DOCUMENTS

| 3,277,163 A |   | 10/1966 | Waldmann et al. |        |
|-------------|---|---------|-----------------|--------|
| 3,488,348 A |   | 1/1970  | Mayer et al.    |        |
| 3,848,028 A |   | 11/1974 | Engelhard et al.|        |
| 3,988,377 A |   | 10/1976 | Lamberti et al. |        |
| 5,308,512 A | * | 5/1994  | Stoll et al.    | 510/524 |
| 5,585,517 A |   | 12/1996 | Deisenroth et al.|       |
| 7,049,472 B2|   | 5/2006  | Lal et al.      |        |

FOREIGN PATENT DOCUMENTS

| DE | 1670657    | 12/1970 |
|----|-----------|---------|
| GB | 1120652    | 7/1968  |
| SU | 1268572 A1 | 11/1986 |

OTHER PUBLICATIONS

Brittain, J., et al, Triphenylsilanethiol: A Solid H$_2$S Equivalent in the Ring Opening of Epoxides, Tetrahedron Letters, vol. 34, No. 21, pp. 3363-3366 (1993).

* cited by examiner

*Primary Examiner*—Randy Gulakowski
*Assistant Examiner*—Timothy J. Kugel
(74) *Attorney, Agent, or Firm*—Michael Leach

(57) ABSTRACT

Compositions containing surfactant compounds according to formula (I)

$$ROCH_2CH(OH)CR_1R_2ZCR_1R_2CH(OH)CH_2OR, \quad (I)$$

wherein Z is S, SO, or SO$_2$, can have a range of equilibrium and/or dynamic surface tensions and a range of foaming performance attributes, depending upon the particular values of Z, R, R$_1$, and R$_2$. The compounds of formula (I) may be prepared by a process that includes reaction of a sulfide source such as a metal sulfide or bisulfide with an alkyl glycidyl ether. The compounds may be useful in any of a broad range of applications requiring the use of a surfactant.

2 Claims, No Drawings

SUBTERRANEAN WELL AND OIL OR GAS STREAM TREATMENT WITH BIS(3-ALKOXYALKAN-2-OL) SULFIDES, SULFONES, AND SULFOXIDES: NEW SURFACE ACTIVE AGENTS

CROSS-REFERENCE TO RELATED APPLICATIONS

This application is a divisional of application Ser. No. 11/076,723, filed Mar. 10, 2005, now U.S. Pat. No. 7,205,431 which is a continuation in part of application Ser. No. 10/899,419, filed Jul. 26, 2004 now U.S. Pat. No. 7,049,472.

FIELD OF THE INVENTION

This invention relates to surfactant compositions. More particularly, it relates to adducts of sulfides with glycidyl ethers and their use to reduce the surface tension in water-based systems.

BACKGROUND OF THE INVENTION

The ability to reduce the surface tension of water is of great importance in the application of water-based formulations because decreased surface tension translates to enhanced substrate wetting during use. Examples of water-based compositions requiring good wetting include coatings, inks, adhesives, fountain solutions for lithographic printing, cleaning compositions, metalworking fluids, agricultural formulations, electronics cleaning and semiconductor processing compositions, personal care products, and formulations for textile processing and oilfield applications. Surface tension reduction in water-based systems is generally achieved through the addition of surfactants, resulting in enhanced surface coverage, fewer defects, and more uniform distribution. Equilibrium surface tension (EST) is important when the system is at rest, while dynamic surface tension (DST) provides a measure of the ability of a surfactant to reduce surface tension and provide wetting under high speed application conditions.

The importance of the ability of a surfactant to achieve low surface tension at low use levels, the ability to affect foaming performance, and the surfactant's ability to provide efficient emulsification and solubilization are all of considerable industrial importance, as is well-appreciated in the art. And, although equilibrium surface tension reduction efficiency is important for some applications, other applications may require both equilibrium and dynamic surface tension reduction.

The foaming characteristics of a surfactant are also important because they can help define applications for which the surfactant might be suitable. For example, foam can be desirable for applications such as ore flotation and cleaning. On the other hand, in coatings, graphic arts and adhesive applications, foam is undesirable because it can complicate application and lead to defect formation. Thus foaming characteristics are frequently an important performance parameter.

The wide variety of applications for which surfactants are used, and the resultant variation in performance requirements, results in a need for a correspondingly large number of surfactants adapted to these various performance demands, and a need for suitable methods for making them.

SUMMARY OF THE INVENTION

In one aspect, the invention provides a formulation including:
i) a first component consisting of one or more compounds according to formula (I)

$$ROCH_2CH(OH)CR_1R_2ZCR_1R_2CH(OH)CH_2OR \qquad (I)$$

wherein each R is independently selected from the group consisting of C4-C20 branched, linear, and cyclic alkyl, alkenyl, aryl, and aralkyl moieties; C4-C20 branched, linear, and cyclic alkyl, alkenyl, aryl, and aralkyl moieties bearing a carbonyl group or one or more heteroatoms selected from O, S, and N; glycol ether moieties of the formula $R_3(OCH_2CH_2)_n$—; aminoethylene moieties of the formula $R_3(NHCH_2CH_2)_n$—; and thioether moieties of the formula $R_3S(CH_2)_n$—; wherein $R_3$ is H or linear C1-C12 alkyl and n is an integer from 1 to 15, $R_1$ and $R_2$ are each independently H or a C1-C4 alkyl group, and Z is S, SO, or $SO_2$; and
ii) a second component consisting of one or more materials selected from the group consisting of mineral acids, formic acid, acetic acid, tetramethylammonium hydroxide, nonvolatile organic materials, nonvolatile inorganic materials, and mixtures of these, the second component not including any component of a pre- or post-preparation synthesis reaction mixture for preparation of any of the one or more compounds according to formula (I);
wherein the formulation is fluid at 25° C.

In another aspect, the invention provides, in a method for drilling, completing, cementing, stimulating, fracturing, acidizing, working over, or treating a subterranean well, an improvement that includes injecting into the well a fluid including one or more compounds according to formula (I) as defined immediately above.

In yet another aspect, the invention provides, in a method for treating a produced stream of oil or gas from an oil and gas bearing formation, an improvement that includes injecting into the produced stream a fluid including one or more compounds according to formula (I) as defined above.

DETAILED DESCRIPTION OF THE INVENTION

The present invention relates to novel surfactant compositions that are capable of effectively reducing the dynamic and/or equilibrium surface tension of aqueous systems, and/or affecting foaming performance of such systems. The compositions include bis(3-alkoxyalkan-2-ol) sulfides, sulfones, and sulfoxides according to the following formula (I), wherein Z represents S, SO, or $SO_2$, respectively:

$$ROCH_2CH(OH)CR_1R_2ZCR_1R_2CH(OH)CH_2OR \qquad (I)$$

Each R is independently a C4-C20 alkyl, alkenyl, aryl, or aralkyl moiety, and may be branched, linear, or cyclic. It may also be such a moiety bearing a carbonyl group, especially a carboxylic acid, ester, or amide, and/or one or more heteroatoms selected from O, S, and N. Such moieties may be in any location on R. Typically R is a C8-C18 linear alkyl group, and more typically it is a C12-C16 linear alkyl group. In some embodiments, R is a C8-C10 or a C12-C16 hydrocarbyl moiety, especially a linear alkyl moiety. R may also be a glycol ether moiety of the formula $R_3(OCH_2CH_2)_n$—, an aminoethylene moiety of the formula $R_3(NHCH_2CH_2)_n$—, or a thioether moiety of the formula $R_3S(CH_2)_n$—, wherein $R_3$ is H or linear C1-C12 alkyl and n is an integer from 1 to 15. Nonlimiting examples of suitable R groups include butyl, hexyl, octyl, 2-ethylhexyl, decyl, dodecyl, tetradecyl, hexadecyl, octadecyl, phenyl, cresyl (any isomer, attached at any ring position or at the phenolic oxygen), and mixtures thereof. Typically, the R groups will be one or more of butyl, 2-ethylhexyl, octyl, decyl, dodecyl, tetradecyl. $R_1$ and $R_2$ are each independently H or a C1-C4 alkyl group. Exemplary compositions according to the present invention are: 1,1'-thiobis(3-butoxypropan-2-ol), 1,1'-thiobis(3-octyloxypropan-2-ol), 1,1'-thiobis(3-decyloxypropan-2-ol), 1,1'-thiobis(3-(2-ethylhexyloxy)propan-2-ol), 1,1'-thiobis(3-dodecyloxypropan-2-ol), and 1,1'-thiobis(3-tetradecyloxypropan-2-ol).

Preparation of Compounds of Formula (I)

Compounds according to formula (I) may be prepared by any method known in the synthetic organic chemical art. In one exemplary embodiment of the invention, they may be prepared by the reaction of a sulfide source with a glycidyl ether according to formula (II), wherein R, $R_1$, and $R_2$ are as defined above, and wherein Z=S. Compounds wherein Z is SO or $SO_2$ may be made by oxidation of the corresponding compound where Z is S, using oxidation techniques well known in the art. In one exemplary embodiment of the invention oxidation is performed with hydrogen peroxide, but other methods may be used.

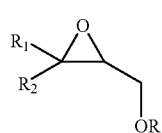

(II)

As used herein, the term "sulfide source" means a composition that contains, or otherwise provides, any of hydrogen sulfide, a bisulfide anion, or a sulfide anion. Suitable nonlimiting examples of sulfide sources include compounds $M_2S$ wherein each M is independently selected from the group consisting of H, $NH_4$, alkali metals, and alkaline earth metals. Specific examples of suitable sulfides and bisulfides include sodium sulfide, sodium bisulfide, potassium sulfide, potassium bisulfide, lithium sulfide, and lithium bisulfide in the anhydrous form or as hydrates. Other sulfide sources include alkali metal polysulfides and disulfides. The amount of glycidyl ether used in the reaction is typically from about 2.0 to about 5 moles per mole of sulfide, more typically from about 2 to about 3 moles, still more typically from about 2 to about 2.5 moles, and most typically about 2 moles per mole of sulfide. Mixtures of glycidyl ethers may be employed such that the reaction mixture will contain glycidyl ethers having two or more different R groups, two or more different $R_1$ groups, and/or two or more different $R_2$ groups. In such a situation, the product may include a mixture of compounds according to formula (I) in which some have the same R, $R_1$, and $R_2$ groups on both sides of the molecule, while others have different embodiments of any or all of these groups on one side vs. the other.

To prepare compounds according to formula (I), the sulfides or bisulfides may be reacted (adducted) with the glycidyl ether, which may optionally be dispersed in a reaction medium including a diluent, at a temperature sufficiently high so as to provide a convenient reaction rate and sufficiently low so as to prevent significant by-product formation. By "dispersed," it is meant that the glycidyl ether is suspended in the medium, dissolved in it, or a combination of these. The reaction temperature may be in the range from about 50° C. to about 150° C., preferably from about 50° C. to about 130° C., and more preferably from about 60° C. to about 90° C. The optimum conditions will depend upon the specific reactants, the reactor configuration, the solvents employed, and other variables. A variety of diluents may be used for the reaction, including liquids in which one or more of the reactants is essentially insoluble. More typically, a diluent (if used) will be a material that is a solvent for one or more of the reactants. Examples of suitable solvents include, but are not limited to, isopropanol, ethanol, methanol, acetonitrile, ethylene glycol, propylene glycol, combinations of water and acetonitrile, combinations of water and methanol, combinations of water and isopropanol, combinations of water and ethanol, and mixtures thereof. Typically, isopropanol will be used.

Uses of Compounds of Formula (I)

Compositions according to the invention may also include a variety of other ingredients adapted to complement the utility of compounds of formula (I) in a number of applications. The performance properties of such products may be optimized for a specific application by appropriate modification of the structure of the sulfide and the choice of the substituents R, $R_1$, and $R_2$. Such optimization is routine, and within the ability of the person of ordinary skill in the art in the particular application area. Thus manipulation of these variables yields compounds which may be useful as emulsifiers or detergents, wetting agents, foaming agents, defoamers, rheology modifiers or associative thickeners, dispersants, and the like. As such, these compounds may be useful in applications such as coatings, inks, adhesives, agricultural formulations, fountain solutions, photoresist strippers and developers, shampoos, and detergents and other cleaning compositions. The compounds may also find use in oil-field exploration, development, and production applications such as enhanced oil recovery, fracturing and stimulation processes, and drilling and cementing operations, and may also be useful in various wet-processing textile operations, such as dyeing of fibers and fiber scouring and kier boiling. The general formulation principles governing each of these applications are well known in the respective arts, and a detailed description of the numerous application areas and methods for incorporating the compounds of this invention into such formulations is not necessary to their effective incorporation therein. However, as an indication of the wide scope of possible uses for compounds according to the invention, exemplary but nonlimiting formulations are set forth below for a number of application areas.

The terms "water-based", "waterborne", "aqueous", or "aqueous medium", or "aqueous carrier" as used herein refer to systems in which the solvent or liquid dispersing medium comprises at least 50 wt % water, preferably at least 90 wt %, and more preferably at least 95 wt % water. The dispersing medium may consist essentially of water, i.e. it may have no added solvents.

In broad terms, compounds according to formula (I) may be used in a wide range of formulations that include a second component, such that the application of the second component benefits from the surface active properties provided by the formula (I) material. It is to be understood that, although components of a pre- or post-preparation synthesis reaction mixture for preparation of the compounds according to formula (I) may be present, these do not count as part of the second component for purposes of this invention. Such materials might for example include simple salts, solvents, catalysts, organic precursors, reagents, side products, and byproducts related to the preparation of the compound of formula (I). Typically, but not necessarily, the amount by weight of the second component in a formulation will be greater than that of the compound(s) of formula (I).

Formulations containing compounds according to formula (I) according to the invention are typically constructed so as to be fluid at 25° C. They are typically aqueous, but they need not be. The second component may consist of one or more materials selected from the group consisting of mineral acids, formic acid, acetic acid, tetramethylammonium hydroxide, nonvolatile organic materials, nonvolatile inorganic materials, and mixtures of these. As used herein, the term "nonvolatile" means that the indicated material either cannot boil, or it boils at a temperature of at least 150° C. at a pressure of 760 Torr. Thus, although typical volatile solvents may be included in the formulation, they do not constitute a part of the second component. Such volatile solvents, or water, or a combination of these, may in some embodiments be part of a third component of the formulation. Typically, the second and third components in combination constitute between 0.1 and 99.9 wt % of the formulation.

Typical non-limiting examples of nonvolatile materials are given in the exemplary formulations provided hereinafter. Formulations according to the invention may include ready-to-use formulations, or concentrates. Either of these may be further diluted in use. Thus the concentration of the one or more compounds of formula (I) in a composition according to the invention may vary over a wide range. Typically it will be between 0.001 and 45 wt % of the formulation, although in some cases the amount may be as low as 0.00001 wt %. In many cases compositions at the higher end of this concentration range will be diluted during or before use in the intended application, although this is not required in all applications.

By using compounds of formula (I), it is possible to reduce surface tension in a waterborne composition or an industrial process. Thus the invention provides aqueous compositions comprising such compounds, wherein the surfactant provides good wetting properties when used in a surfactant effective amount. For example, the amount of surfactant that is effective to provide enhanced wetting properties of a water-based, organic compound containing composition may range from 0.00001 to 5 wt %, preferably from 0.0001 to 3 wt %, and most preferably from 0.001 to 3 wt %, based on total weight of the formulation. The most favorable amount will vary from one application to another, depending upon the amount and type of other species present in the formulation that are capable of affecting foam properties and wetting performance, for example latex polymers.

A typical water-based coating formulation that includes the surfactants of the invention may include the following components in an aqueous medium, typically at 30 to 80% solids:

| Typical Aqueous-Based Coating Formulation | |
|---|---|
| 0 to 50 wt % | Pigment Dispersant/Grind Resin |
| 0 to 80 wt % | Coloring Pigments/Extender Pigments/Anti-Corrosive Pigments/Other Pigment Types |
| 5 to 99.9 wt % | Water-Borne/Water-Dispersible/Water-Soluble Resins |
| 0 to 30 wt % | Slip Additives/Antimicrobials/Processing Aids/Defoamers |
| 0 to 50 wt % | Coalescing or Other Solvents |
| 0.01 to 10 wt % | Surfactant/Wetting/Flow and Leveling Agents, other than Compound of Formula (I) |
| 0.001 to 5 wt % | Compound(s) of Formula (I) |

A typical water-based ink composition that includes the surfactants of the invention may include the following components in an aqueous medium at a 20 to 60% solids content (i.e. not including the coalescing solvent):

| Typical Aqueous-Based Ink Composition | |
|---|---|
| 1-50 wt % | Pigment |
| 0 to 50 wt % | Pigment Dispersant/Grind Resin |
| 0 to 50 wt % | Clay base in appropriate resin solution vehicle |
| 5 to 99.9 wt % | Water-borne/water-dispersible/water-soluble resins |
| 0 to 30 wt % | Coalescing Solvents |
| 0.01 to 10 wt % | Surfactant/Wetting Agents, other than Compound(s) of Formula (I)s |
| 0.01 to 10 wt % | Processing Aids/Defoamers/Solubilizing Agents |
| 0.001 to 5 wt % | Compound(s) of Formula (I) |

A typical water-based agricultural composition that includes the surfactants of the invention may include the following components in an aqueous medium at 0.01 to 80% of the following ingredients:

| Typical Aqueous-Based Agricultural Composition | |
|---|---|
| 0.1-50 wt % | Pesticide or Plant Growth Modifying Agent |
| 0.01 to 10 wt % | Surfactants, other than Compound(s) of Formula (I)s |
| 0 to 5 wt % | Dyes |
| 0 to 20 wt % | Thickeners/Stabilizers/Co-surfactants/Gel Inhibitors/Defoamers |
| 0 to 25 wt % | Antifreeze agent (e.g. ethylene glycol or propylene glycol) |
| 0.001 to 5 wt % | Compound(s) of Formula (I) |

A typical fountain solution composition for planographic printing that includes the surfactants of the invention may include the following components:

| Typical Fountain Solution for Planographic Printing | |
|---|---|
| 0.05 to 10 wt % | Film forming, water soluble macromolecule |
| 1 to 25 wt % | C2-C12 Alcohol, glycol, or polyol (water soluble, or soluble due to use of a co-solvent) |
| 0.01 to 20 wt % | Water soluble organic acid, inorganic acid, or a salt of these |
| 30 to 98.9 wt % | Water |
| 0.001 to 5 wt % | Compound(s) of Formula (I) |

A typical hard surface cleaner that includes the surfactants of the invention may include the following components:

| Typical Hard Surface Cleaner | |
|---|---|
| 0 to 25 wt %* | Anionic surfactant |
| 0 to 25 wt %* | Cationic surfactant |
| 0 to 25 wt %* | Nonionic surfactant (e.g. alcohol alkoxylates, etc.) |
| 0 to 20 wt % | Chelating agent (EDTA, citrate, tartrate, etc.) |

-continued

| Typical Hard Surface Cleaner | |
|---|---|
| 0 to 20 wt %* | Solvent (Glycol ether, lower alcohols, etc.) |
| 0.001 to 25 wt % | Compound(s) of Formula (I) |
| 0 to 2 wt % | Dye, fragrance, preservative, etc. |
| 0 to 40 wt %* | Alkali metal hydroxide |
| Balance to 100 wt % | Water, and optionally other ingredients |

*To total, in combination, between 0.1 and 99 wt %.

A typical water-based photoresist developer or electronic cleaning composition that includes the surfactants of the invention may include the following components:

| Typical Aqueous-Based Photoresist Developer Composition | |
|---|---|
| 0.1 to 3 wt % | Tetramethylammonium hydroxide |
| 0 to 4 wt % | Phenolic resin |
| 92.5 to 99.9 wt % | Water |
| 0.001 to 5 wt % | Compound(s) of Formula (I) |

A typical metalworking fluid that includes the surfactants of the invention may include the following components:

| Typical Synthetic Metalworking Fluid Formulation | |
|---|---|
| 2.5 to 10 wt % | Block copolymer or other emulsifying agent |
| 10 to 25 wt % | Alkanolamine |
| 2 to 10 wt % | Organic monoacid |
| 0 to 5 wt % | Organic diacid |
| 40 to 84.4 wt % | Water |
| 1 to 5 wt % | Biocide |
| 0.001 to 5 wt % | Compound(s) of Formula (I) |

Surfactants are also used in a wide variety of products in the areas of personal care and household and industrial cleaning. The surfactants of the present invention may be used in any of these formulations to provide one or more benefits, with the exact structure of the surfactant compound depending upon the specific performance features required for a particular application. Typical formulations used in these markets are described in Louis Ho Tan Tai's book, *Formulating Detergents and Personal Care Products: A Complete Guide to Product Development* (Champaign, Ill.: AOCS Press, 2000) as well as in other books, literature, product formularies, etc. familiar to those skilled in the art. A few representative example formulations are described here as illustrations. For example, a rinse aid for use in household automatic dishwashing or in industrial and institutional warewashing may have the ingredients described below.

| Typical Rinse Aid Formulation | |
|---|---|
| Compound(s) of Formula (I) | 0.001 to 45 wt % |
| Nonionic surfactant other than a compound of Formula (I) (e.g. alkoxylated alcohol(s), alkoxylated block copolymers, etc.) | 0 to 45 wt % |
| Hydrotrope (e.g. sodium xylenesulfonate, sodium toluenesulfonate, anionic surfactant(s), amphoteric surfactant(s), etc.) | 0 to 10 wt % |

-continued

| Typical Rinse Aid Formulation | |
|---|---|
| Isopropyl alcohol or ethyl alcohol | 0 to 10 wt % |
| Chelant (e.g. citric acid, etc.) | 5 to 20 wt % |
| Water, and optionally other ingredients | Balance to 100 wt % |

| Typical Powdered Laundry Detergent Formulation | | |
|---|---|---|
| Material | Amount by Weight in Conventional Formulation | Amount by Weight in Concentrated Formulation |
| Compound(s) of Formula (I) | 0.001 to 5 wt % | 0.001 to 15 wt % |
| Detergent surfactant(s) (e.g. anionic surfactants, alcohol alkoxylates, etc.) | 0.1 to 30 wt % | 0.1 to 50 wt % |
| Builder/co-builder (zeolites, sodium carbonate, phosphates, etc.) | 25 to 50 wt % | 25 to 60 wt % |
| Bleach and bleach activator (perborates, etc.) | 0 to 25 wt % | 0 to 25 wt % |
| Other Additives (fragrance, enzymes, hydrotropes, etc.) | 0 to 7 wt % | 1 to 10 wt % |
| Fillers (sodium sulfate, etc.) | 5 to 35 wt % | 0 to 12 wt % |

| Typical Aqueous Liquid Laundry Detergent Formulation | | |
|---|---|---|
| Material | Amount by Weight in Conventional Formulation | Amount by Weight in Concentrated Formulation |
| Compound(s) of Formula (I) | 0.001 to 25 wt % | 0.001 to 30 wt % |
| Detergent surfactant(s) (e.g. anionic surfactants, alcohol alkoxylates, etc.) | 0 to 35 wt % | 0 to 65 wt % |
| Builder/co-builder (citrate, tartrate, etc.) | 3 to 30 wt % | 0 to 36 wt % |
| Other Additives (fragrances, dyes, etc.) | 0.1 to 5 wt % | 1 to 5 wt % |
| Water and other solvents (e.g. lower alcohols) | 5 to 75 wt % | 1 to 56 wt % |

| Typical Non-Aqueous Laundry Detergent Formulation | |
|---|---|
| Material | Amount by Weight |
| Compound(s) of Formula (I) | 0.001 to 30 wt % |
| Detergent surfactant(s) (e.g. anionic surfactants, alcohol alkoxylates, amine oxides, etc.) | 0.1 to 42 wt % |
| Builder/co-builder (zeolites, sodium carbonate, phosphates, citrate or tartrate salts, etc.) | 25 to 60 wt % |
| Bleach and bleach activator (perborates, etc.) | 0 to 20 wt % |
| Anti-redeposition aids (sodium carboxymethylcellulose, etc.) | 0.5 to 5 wt % |
| Other Additives (fragrance, enzymes, etc.) | 0 to 5 wt % |
| Polyalkylene glycol | 0 to 50 wt % |

Typical 2-Part Industrial and Institutional Laundry Formulation

| | Amount by Weight of Material in Each Pack |
|---|---|
| Pack A | |
| Compound(s) of Formula (I) | 0.001 to 20 wt % |
| Detergent surfactant(s) (e.g. anionic surfactants, alcohol alkoxylates, etc.) | 0 to 20 wt % |
| Antiredeposition aids (sodium carboxymethylcellulose, etc.) | 0.01 to 2 wt % |
| Water, and optionally other ingredients | Balance to 100 wt % |
| Pack B | |
| Sodium silicate | 5 to 10 wt % |
| Sodium metasilicate | 0 to 30 wt % |
| Tetrapotassium pyrophosphate | 0 to 10 wt % |
| potassium hydroxide | 0 to 35 wt % |
| potassium carbonate | 0 to 15 wt % |
| Water, and optionally other ingredients | Balance to 100 wt % |
| Mix Ratio Pack A:Pack B | 1:2 to 1:4 |

Typical Shampoo or Liquid Body Wash Formulation

| Material | Amount by Weight |
|---|---|
| Compound(s) of Formula (I) | 0.001 to 5 wt % |
| Anionic surfactant(s) (e.g. sodium or ammonium lauryl sulfate, sodium or ammonium lauryl sulfate, etc.) | 0.1 to 30 wt % |
| Amphoteric cosurfactant(s) (e.g. cocoamidopropyl betaine, etc.) | 0 to 20 wt % |
| Nonionic surfactant other than a compound of Formula (I) (e.g. alcohol alkoxylates, sorbitan esters, alkyl glucosides, etc.) | 0 to 20 wt % |
| Cationic polymers (e.g. polyquaternium, etc.) | 0 to 5 wt % |
| Other Additives (fragrance, dyes, oils, opacifiers, preservatives, chelants, hydrotropes, etc.) | 0 to 15 wt % |
| Polymeric thickeners (e.g. polyacrylate, etc.) | 0 to 2 wt % |
| Conditioning oils (e.g. sunflower oil, petrolatum, etc.) | 0 to 10 wt % |
| Citric acid | 0 to 2 wt % |
| Ammonium chloride or sodium chloride | 0 to 3 wt % |
| Humectants (e.g. propylene glycol, glycerin, etc.) | 0 to 15 wt % |
| Glycol distearate | 0 to 5 wt % |
| Cocoamide (i.e. cocoamide MEA, cocoamide MIPA, PEG-5 cocoamide, etc.) | 0 to 10 wt % |
| Dimethicone | 0 to 5 wt % |
| Behenyl alcohol | 0 to 5 wt % |
| Water, and optionally other ingredients | Balance to 100 wt % |

Typical Hair Conditioner Formulation

| Material | Amount by Weight |
|---|---|
| Compound(s) of Formula (I) | 0.001 to 10 wt % |
| Nonionic surfactant other than a compound of Formula (I), and/or fatty alcohol(s) (e.g. stearyl alcohol, etc.) | 0.1 to 10 wt % |
| Cationic surfactant(s) (e.g. cetrimonium chloride, etc.) | 0 to 10 wt % |
| Anionic surfactants (e.g. TEA-dodecylbenzenesulfonate, etc.) | 0 to 5 wt % |
| Silicones (e.g. dimethicone, dimethiconal, etc.) | 0 to 5 wt % |
| Cationic polymers (e.g. polyquaternium, etc.) | 0 to 10 wt % |
| Other Additives (fragrance, dyes, oils, opacifiers, preservatives, chelants, hydrotropes, etc.) | 0 to 10 wt % |
| Thickening polymers (e.g. hydroxyethylcellulose, polyacrylates, etc.) | 0 to 5 wt % |
| Potassium, ammonium or sodium chloride | 0 to 5 wt % |
| Humectant (e.g. propylene glycol, etc.) | 0 to 5 wt % |
| Panthenol | 0 to 2 wt % |
| Water, and optionally other ingredients | Balance to 100 wt % |

Typical Aqueous Sunscreen Formulation

| Material | Amount by Weight |
|---|---|
| Compound(s) of Formula (I) | 0.001 to 30 wt % |
| Polyethylene glycol (e.g. PEG-8, etc.) | 0 to 30 wt % |
| Active sunscreen agents (e.g. octyl methoxycinnamate, azobenzone, homosalate, octyl salicylate, oxybenzone, octocrylene, butyl methoxydibenzoylmethane, octyl triazone, etc.) | 1 to 30 wt % |
| Esters and emollients (e.g. dimethicone, methylparaben, propylparaben, polysorbates, etc.) | 0 to 20 wt % |
| Thickening polymers (e.g. acrylates/C10-30 alkyl acrylate crosspolymer, PVP/hexadecene copolymer, etc.) | 0 to 20 wt % |
| Other Additives (fragrance, dyes, oils, opacifiers, preservatives, chelants, etc.) | 0 to 15 wt % |
| Solvent/hydrotropes (e.g. propylene glycol, benzyl alcohol, dicapryl ether, etc.) | 0 to 20 wt % |
| Triethanolamine | 0 to 5 wt % |
| Water, and optionally other ingredients | Balance to 100 wt % |

Cement Admixture Formulations

Cement admixtures may be of any of several types, including superplasticizing, plasticizing, accelerating, set retarding, air entraining, water-resisting, corrosion inhibiting, and other types. Such admixtures are used to control the workability, settling and end properties (strength, impermeability, durability and frost/deicing salt resistance, etc.) of cementitious products like concretes, mortars, etc. The admixtures are usually provided as aqueous solutions and they can be added to the cementitious system at some point during its formulation. Surfactants of this invention may provide wetting, foam control, flow and leveling, water reduction, corrosion inhibition, high ionic strength tolerance and compatibility, and other benefits when used in such systems.

Exemplary Cement Admixture Ingredients

| Material | Amount by Weight Relative to Cement Weight |
|---|---|
| Compound(s) of Formula (I) | 0.001 to 5 wt % |
| Solubilizing agents (solvent, hydrotropes, amines, etc.)* | 0 to 10 wt % |
| Polymers and/or oligomers (e.g. lignosulfonates, sulfonated melamine formaldehyde condensates, polycarboxylates, styrene-maleic anhydride oligomers, copolymers and their derivatives, etc.)* | 0 to 5 wt % |

-continued

Exemplary Cement Admixture Ingredients

| Material | Amount by Weight Relative to Cement Weight |
|---|---|
| Functional Additives (defoamers, air entraining or detraining agents, pH control additives, corrosion inhibitors, set retarders, accelerators, preservatives, etc.)* | 0 to 5 wt % |
| Water | 40 to 75% |

*To total, in combination, between 0.1 and 20 wt %.

Oil and Gas Field Formulations

Surfactants of this invention, used alone or as a component in formulations, may provide surface tension reduction, foam control, and improved wetting in a variety of applications within the Oil and Gas industry. These may include, for example, formulations for the following uses.

In drilling applications, the surfactants may be used in formulations for dispersion of clays and drill cuttings, ROP (rate of penetration) enhancement, emulsification and de-emulsification, surface wetting and surface tension reduction, shale stabilization, and enhancement of hydration or dissolution of solid additives.

In cementing, stimulation and workover applications, uses may include formulations for spacers, cement dispersion, de-air entraining and defoaming, cement retardation, fracturing fluids, stimulation of coal bed methane, surface or interfacial tension reduction, oil/water wetting, and cleaning fluids.

In oil and gas production, uses may include rig wash formulations, defoaming of crude, water flooding/injection, defoaming for acid gas sweetening, oil/water separation, enhanced oil recovery, and inhibition or dispersion of asphaltenes, hydrates, scale and waxes.

Exemplary fluids for drilling, completing, cementing, stimulating, fracturing, acidizing, or working over of subterranean wells, or for enhancing production from an oil- or gas-bearing formation or treating the produced oil or gas, typically include from 0.05 to 10 wt % of a surfactant of this invention in a fluid containing water and/or an organic liquid, which typically constitutes from 5 to 99.85 wt % of the fluid. The organic liquid is typically a petroleum product, although it need not be, and may for example include crude oil or any of the drilling mud base oils described below. If water is included, it may be from a freshwater, sea water, or brine source, or it may be provided by inclusion of an aqueous mineral acid such as hydrochloric acid, hydrofluoric acid, sulfuric acid, etc. Fluids for such applications usually also include between 0.1 and 80 wt % in total of one or more ingredients selected from weighting agents, viscosifiers, dispersants, drilling mud base oils, emulsifiers, soluble salts, cements, proppants, mineral acids, organic acids, biocides, defoamers, demulsifiers, corrosion inhibitors, friction reducers, gas hydrate inhibitors, hydrogen sulfide removal or control additives, asphaltene control additives, paraffin control additives, and scale control additives. A variety of specific materials are known in the art for performing these functions. Suitable nonlimiting examples of some of these materials follow, and others will be apparent to those of skill in the art.

Weighting agents: barium sulfate, hematite, and ilmenite.

Viscosifiers: clays (e.g. bentonite, attapulgite), water-soluble polymers (e.g. xanthan gum, guar, polysaccharides, modified polysaccharides), organophilic clays, and oil-soluble polymers.

Dispersants: lignosulfonates, naphthalene sulfonates, sulfonated melamine formaldehyde resins.

Drilling mud base oils: diesel, mineral oil, olefinic oils, paraffinic oils, and esters.

Emulsifiers: fatty acids, fatty amides, anionic surfactants, and nonionic alkoxylated surfactants.

Soluble salts (e.g. for specific gravity adjustment, shale stabilization, or osmotic pressure control): NaCl, NaBr, KCl, KBr, $CaCl_2$, $CaBr_2$, $ZnCl_2$, $ZnBr_2$, sodium formate, potassium formate, and cesium formate.

Cements

Other Surfactants: cationic surfactants, amphoteric surfactants, alkyl glucosides, phosphate esters, and fluorosurfactants.

Proppants: ceramics, sintered bauxite, sand, and resin-coated sand.

Organic Acids: formic acid, acetic acid, citric acid.

Mineral acids: hydrochloric acid and hydrofluoric acid.

The foregoing classes of materials may find application, when used in combination with the surfactants of this invention, in a variety of oilfield applications. Depending upon the exact application and desired effect, compositions may be injected into a well or added to the stream of oil or gas produced by the well, all according to methods well known in the art.

Typical applications, and the ingredients commonly (although not necessarily) used in making formulations for these purposes, are shown immediately below. Other ingredients may also be present. It will be understood that each of these formulations will also contain a surfactant according to the invention.

Water-based drilling muds: weighting agents, viscosifiers, and dispersants.

Oil-based drilling muds: base oil, emulsifier, and viscosifier.

Completion fluids: soluble salts for specific gravity adjustment.

Cement Formulations: the cements themselves, in combination with dispersants.

Spacers: weighting agents and surfactants.

Acidizing fluids: surfactants and one or both of mineral acids and organic acids.

Fracturing fluids: viscosifiers, proppants, and surfactants.

Fluids for stimulating or enhancing production from a gas or oil bearing formation, may contain ingredients similar to those found in fracturing fluids, except for proppants. Finally, fluids for treating oil or gas produced in the above ways may include one or more of biocides, defoamers, demulsifiers, corrosion inhibitors, friction reducers, gas hydrate inhibitors, hydrogen sulfide removal or control additives, asphaltene control additives, paraffin control additives, and scale control additives.

As will be appreciated in light of the foregoing discussion, the surfactants of this invention may find utility in a wide variety of applications. The present invention is further illustrated by the following examples, which are presented for purposes of demonstrating, but not limiting, the methods and compositions of this invention.

EXAMPLES

Example 1

Reaction of Sodium Bisulfide with Butyl Glycidyl Ether

A solution of butyl glycidyl ether (2.91 g, 22.39 mmol) in isopropanol (5 mL) and $H_2O$ (1 mL) was added to sodium bisulfide (0.628 g, 11.20 mmol) under nitrogen in a 100 mL 3-neck round bottom flask equipped with a $N_2$ inlet, a rubber septum, glass stopper and a magnetic stir bar. The mixture was heated at 90° C. and monitored for completion by gas chromatography/mass spectrometry for disappearance of starting materials and formation of the product. After 3 h, the reaction was judged to be complete. The mixture was cooled to ambient temperature and treated with saturated $NH_4Cl$ (5.0 mL) and extracted into ethyl acetate (50 mL). The solvent was dried ($MgSO_4$), filtered, and evaporated in-vacuo to give the product, 1,1'-thiobis(3-butoxypropan-2-ol), which was identified by mass spectrometry as well as $^1H$ and $^{13}C$ NMR.

Example 1a

Reaction of Sodium Sulfide with Butyl Glycidyl Ether

A reaction was carried out in a manner similar to that described in Example 1, starting from butyl glycidyl ether (2.91 g, 22.39 mmol) and sodium sulfide heptahydrate (2.69 g, 11.2 mmol). The product obtained was 1,1,-thiobis(3-butoxypropan-2-ol), identified as in Example 1.

Example 2

Reaction of Sodium Sulfide with Mixture of C12, C14, and C16 Glycidyl Ethers A reaction was carried out in a manner similar to that described in Example 1, starting from sodium sulfide (22.48 g, 288 mmol) and a mixture of C12, C14, and C16 glycidyl ethers (139.62 g, ~576 mmol) in 100 mL of isopropanol and 47 mL of $H_2O$. The product, identified as in Example 1, was a mixture of 1,1,-thiobis(3-dodecyloxypropan-2-ol), 1,1,-thiobis(3-tetradecyloxypropan-2-ol), 1,1,-thiobis(3-hexadecyloxypropan-2-ol), and three analogous mixed species having, respectively, one dodecyloxy and one tetradecyloxy group, one hexadecyloxy and one tetradecyloxy group, and one hexadecyloxy and one dodecyloxy group.

Example 3

Reaction of Sodium Sulfide with a Mixture of C8 and C10 Glycidyl Ethers

A reaction was carried out in a manner similar to that described in Example 1, starting from sodium sulfide (22.48 g, 288 mmol) and a mixture of C8 and C10 glycidyl ethers (107.14 g ~576 mmol), in 100 mL of isopropanol and 47 mL of $H_2O$. The product, identified as in Example 1, was a mixture of 1,1,-thiobis(3-octyloxypropan-2-ol), 1,1,-thiobis(3-decyloxypropan-2-ol), and the analogous mixed species having one octyloxy and one decyloxy group.

Example 4

Reaction of Sodium Sulfide with 2-ethylhexyl Glycidyl Ether

A reaction was carried out in a manner similar to that described in Example 1, starting from sodium sulfide (22.48 g, 288 mmol) and 2-ethylhexyl glycidyl ether (576 mmol, 107.31 g) in 100 mL of isopropanol and 47 mL of $H_2O$. The product obtained was 1,1,-thiobis(3-(2-ethylhexyl)oxypropan-2-ol), identified as in Example 1.

The reactants and products of Examples 1-4 are shown in Table 1 below.

TABLE 1

Sulfide/Glycidyl Ether Adducts

| Example | sulfide | Glycidyl Ether | Product |
|---|---|---|---|
| 1 | $Na_2S$ | butyl glycidyl ether ($C_4H_9$) | $C_4H_9O$-CH$_2$-CH(OH)-CH$_2$-S-CH$_2$-CH(OH)-CH$_2$-O-$C_4H_9$ <br> SBGE |
| 2 | $Na_2S$ | glycidyl ether, R = mix of $C_{12}H_{25}$, $C_{14}H_{29}$, $C_{16}H_{33}$ | RO-CH$_2$-CH(OH)-CH$_2$-S-CH$_2$-CH(OH)-CH$_2$-O-R <br> R = mix of $C_{12}H_{25}$, $C_{14}H_{29}$, $C_{16}H_{33}$ <br> SDDGE |

TABLE 1-continued

Sulfide/Glycidyl Ether Adducts

| Example | sulfide | Glycidyl Ether | Product |
|---|---|---|---|
| 3 | Na$_2$S | 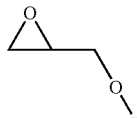 R = mix of C$_8$H$_{17}$, C$_{10}$H$_{21}$ | RO-CH$_2$-CH(OH)-CH$_2$-S-CH$_2$-CH(OH)-CH$_2$-OR<br>R = mix of C$_8$H$_{17}$, C$_{10}$H$_{21}$, SOGE |
| 4 | Na$_2$S | 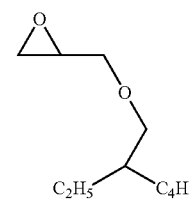 | SEHGE |

Examples 5-8

Equilibrium Surface Tensions

Equilibrium surface tensions were determined for the compounds prepared in Examples 1-4, using a Kruss K-12 tensiometer with a platinum Wilhelmy plate, maintaining the temperature at 25±1° C. by means of a constant temperature circulating bath. The results, reported in Table 2, are averages of 10 measurements over a 10-minute period, and have a standard deviation of less than 0.01 dyne/cm.

TABLE 2

Equilibrium Surface Tension Data for Sulfide/Glycidyl Ether Adducts

| Example | Compound | Surface Tension Dynes/cm (0.1 wt %) | Solubility |
|---|---|---|---|
| 5 | SBGE | 38.4 | <0.1 wt % |
| 6 | SOGE | 34.0 | <0.1 wt % |
| 7 | SEHGE | 37.9 | <0.1 wt % |
| 8 | SDDGE | 34.2 | <0.1 wt % |

Examples 9-12

Foam Characteristics of Sulfide/glycidyl Ether Adducts

Foam height and stability (time to reach zero foam) were measured by the Ross-Miles foam test, using 0.1 wt % solutions of the surfactants. The results of these determinations are presented in Table 3.

TABLE 3

Foam Stability Data

| Example | Compound | Initial Foam Height (cm) | Time to 0 foam (sec) |
|---|---|---|---|
| 9 | SBGE | 0.7 | 2 |
| 10 | SOGE | 0 | 0 |
| 11 | SEHGE | 0 | 0 |
| 12 | SDDGE | 0 | 0 |

The data in Table 3 demonstrate that a range of foam performance may be obtained, depending upon the glycidyl ether capping group. While applications such as coatings, inks, and adhesives require low foam or foam that dissipates quickly, other applications such as cleaning or ore floatation require a controlled amount of foam to be present and to persist. Therefore, compositions incorporating compounds according to formula (I) may find utility in a wide range of applications.

Examples 13-16

Dynamic Surface Tension Data

Dynamic surface tensions were determined for the compounds prepared in Examples 1-4, at 0.1 and 1.0 wt % levels, using a Kruss BP-2 Bubble Pressure Tensiometer. The results of these determinations are shown in Table 4.

TABLE 4

Dynamic Surface Tension

| Example | Compound | Dynamic surface tension (dynes/cm), 0.1 wt % | | | Dynamic surface tension (dynes/cm), 1.0 wt % | | |
|---|---|---|---|---|---|---|---|
| | | 1 b/s | 5 b/s | 20 b/s | 1 b/s | 5 b/s | 20 b/s |
| 13 | SBGE | 37 | 38 | 38 | 36 | 37 | 38 |
| 14 | SOGE | 70 | 71 | 71 | 68 | 70 | 71 |
| 15 | SEHGE | 61 | 68 | 69 | 52 | 57 | 59 |
| 16 | SDDGE | 72 | 72 | 70 | 36 | 50 | 52 | b/s = bubbles/second

The data in Table 4 show that a wide range of dynamic surface tension reduction is possible with this family of molecules providing differing surfactants for strong (Example 13) or moderate (Example 16), surface tension reduction of an aqueous solution or formulation. Depending upon the mode of application of a formulation and the substrate to be wetted (brush application of an industrial coating, spray application of an industrial cleaner, roller application of an adhesive), surfactants that provide such a wide range of dynamic surface tension reduction may find significant commercial utility.

Example 17

Preparation of 1,1'-bis(3-octyloxypropan-2-ol) Sulfoxide and 1,1'-bis(3-octyloxypropan-2-ol) Sulfone A solution of 1,1-thiobis(3-octyloxypropan-2-ol) (5.0 g, 12.32 mmol) in isopropanol (20 mL) was treated with a 30% solution of $H_2O_2$ in water (11.2 mL, 98.52 mmol) under nitrogen in a 100 mL 3-neck round bottom flask equipped with an $N_2$ inlet, a rubber septum, a glass stopper and a magnetic stir bar. The mixture was heated at 60° C. for 24 h. The mixture was cooled to ambient temperature and treated with an aqueous saturated $NaHSO_3$ solution (5.0 mL) and extracted into ethyl acetate (50 mL). The solvent was dried ($MgSO_4$), filtered, and evaporated in-vacuo to give the product as a 1:1 mixture of 1,1'-bis(3-octyloxypropan-2-ol) sulfoxide and 1,1'-bis(3-octyloxypropan -2-ol) sulfone, which were identified by mass spectrometry as well as $^1H$ and $^{13}C$ NMR.

This invention provides novel surfactants with properties that make suitable for use in a wide range of industrial and commercial applications. Such applications include water-based coatings, inks, adhesives, agricultural formulations, aqueous and non-aqueous cleaning compositions, personal care applications, and formulations for textile processing and oilfield applications.

Although the invention is illustrated and described herein with reference to specific embodiments, it is not intended that the subjoined claims be limited to the details shown. Rather, it is expected that various modifications may be made in these details by those skilled in the art, which modifications may still be within the spirit and scope of the claimed subject matter and it is intended that these claims be construed accordingly.

What is claimed is:

1. In a method for drilling, completing, cementing, stimulating, fracturing, acidizing, working over, or treating a subterranean well, the improvement comprising injecting into the well a fluid comprising one or more compounds according to formula (I)

$$ROCH_2CH(OH)CR_1R_2ZCR_1R_2CH(OH)CH_2OR \qquad (I)$$

wherein each R is independently selected from the group consisting of C4-C20 branched, linear, and cyclic alkyl, alkenyl, aryl, and aralkyl moieties; C4-C20 branched, linear, and cyclic alkyl, alkenyl, aryl, and aralkyl moieties bearing a carbonyl group or one or more heteroatoms selected from O, S, and N; glycol ether moieties of the formula $R_3(OCH_2CH_2)_n$—; aminoethylene moieties of the formula $R_3(NHCH_2CH_2)_n$—; and thioether moieties of the formula $R_3S(CH_2)_n$—; wherein $R_3$ is H or linear C1-C12 alkyl and n is an integer from 1 to 15, $R_1$ and $R_2$ are each independently H or a C1-C4 alkyl group, and Z is S, SO, or $SO_2$.

2. In a method for treating a produced stream of oil or gas from an oil and gas bearing formation, the improvement comprising injecting into the produced stream a fluid comprising one or more compounds according to formula (I)

$$ROCH_2CH(OH)CR_1R_2ZCR_1R_2CH(OH)CH_2OR \qquad (I)$$

wherein each R is independently selected from the group consisting of C4-C20 branched, linear, and cyclic alkyl, alkenyl, aryl, and aralkyl moieties; C4-C20 branched, linear, and cyclic alkyl, alkenyl, aryl, and aralkyl moieties bearing a carbonyl group or one or more heteroatoms selected from O, S, and N; glycol ether moieties of the formula $R_3(OCH_2CH_2)_n$—; aminoethylene moieties of the formula $R_3(NHCH_2CH_2)_n$—; and thioether moieties of the formula $R_3S(CH_2)_n$—; wherein $R_3$ is H or linear C1-C12 alkyl and n is an integer from 1 to 15, $R_1$ and $R_2$ are each independently H or a C1-C4 alkyl group, and Z is S, SO, or $SO_2$.

* * * * *